June 5, 1934.  H. HANSEN  1,961,516
KEY CUTTING APPARATUS
Original Filed March 28, 1927  4 Sheets-Sheet 1

Herman Hansen
INVENTOR

BY his ATTORNEYS
Janney, Blair & Curtis

June 5, 1934.  H. HANSEN  1,961,516
KEY CUTTING APPARATUS
Original Filed March 28, 1927  4 Sheets-Sheet 2

Herman Hansen
INVENTOR

BY Janney, Blair & Curtis
ATTORNEYS

June 5, 1934.  H. HANSEN  1,961,516

KEY CUTTING APPARATUS

Original Filed March 28, 1927  4 Sheets-Sheet 3

Herman Hansen
INVENTOR

BY his ATTORNEYS
Janney, Blair & Curtis

June 5, 1934.   H. HANSEN   1,961,516
KEY CUTTING APPARATUS
Original Filed March 28, 1927   4 Sheets-Sheet 4

Herman Hansen
INVENTOR

BY his ATTORNEYS
Janney, Blair & Curtis

Patented June 5, 1934

1,961,516

UNITED STATES PATENT OFFICE 1,961,516

KEY CUTTING APPARATUS

Herman Hansen, New York, N. Y., assignor to Francis Keil & Son, Inc., a corporation of New York Original application March 28, 1927, Serial No. 178,953. Divided and this application December 26, 1931, Serial No. 583,165

12 Claims. (Cl. 90—13.05)

This invention relates to apparatus for cutting keys. One of the objects thereof is to provide a key cutting machine which is practical and efficient and capable of meeting the various requirements of practical use in a highly satisfactory manner. Another object is to provide a machine of the above nature which is capable of a wide range of use. Another object is to provide a machine of the above nature in which various types of keys may be cut or shaped with rapidity and accuracy. Another object is to provide a machine of the above nature which is convenient to operate and in which adjustments to make various cuts are accomplished with the greatest ease. Another object is to provide a machine of the above nature in which the keys to be cut and the master keys to be copied may be conveniently positioned accurately in their holding devices. Another object is to provide a machine of the above nature which is rugged and serviceable. Another object is to provide a machine of the above nature which is compact in construction. Other objects will be in part obvious or in part pointed out hereinafter.

This application is a division of my application Serial No. 178,953, filed March 28, 1927, now Patent No. 1,866,304.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of this invention.

Similar reference characters refer to similar parts throughout the several views of the drawings.

Figure 1:
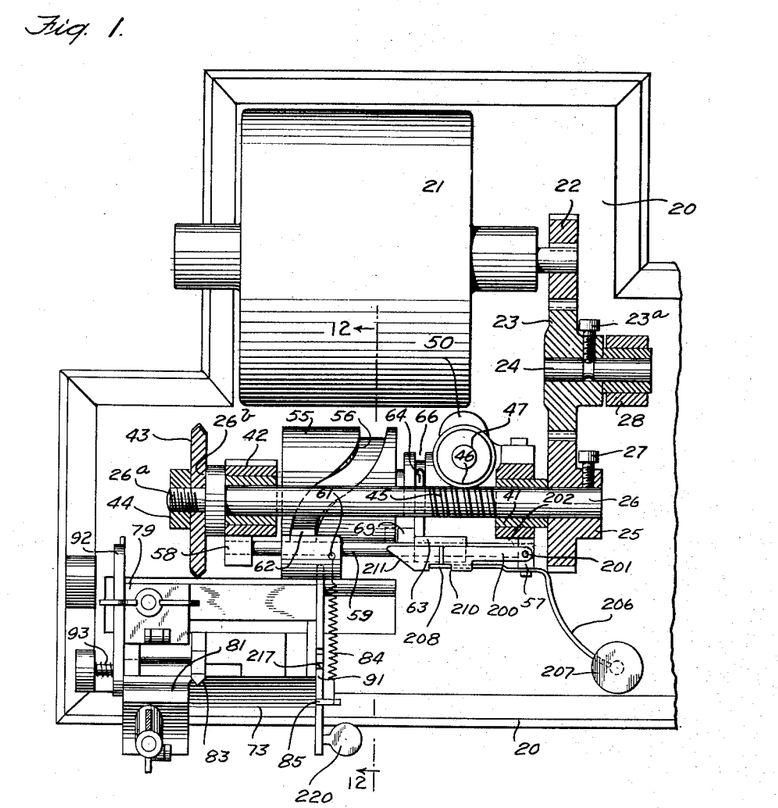
Figure 1 is a top plan view of the apparatus with certain parts shown in horizontal section.

Referring now to the drawings in detail and first to Figure 1, this key cutting apparatus is shown as being mounted upon a suitable platform or base 20 and driven by an electric motor 21. It will be understood, of course, that any other suitable form of power drive may be substituted for the motor. Upon the armature shaft of the motor 21 is shown a gear 22 which meshes with a gear 23 loosely rotating upon a shaft 24. This gear 23 meshes with a gear 25 which is fixed upon a shaft 26, for example, by means of a set screw 27. A set screw 23ª threaded into the hub of the gear 23 engages with a circumferential groove in the surface of the shaft 24 and prevents longitudinal movement of the gear 23 along the shaft 24 while permitting relative rotation of these parts. The shaft 24 is rotatably supported in bearing supports 28 and 29.

Considering now the shaft 26, this shaft is rotatably supported in bearing posts 41 and 42, and at its left-hand end carries a circular cutting tool 43. This tool is held in place upon the reduced end portion 26ª of the shaft and up against a shoulder 26ᵇ by means of a nut 44, and is thus removable and replaceable by other tools by simply removing the nut. The cutting tool 43 is rapidly rotated by its drive from the motor 21.

Figure 10:
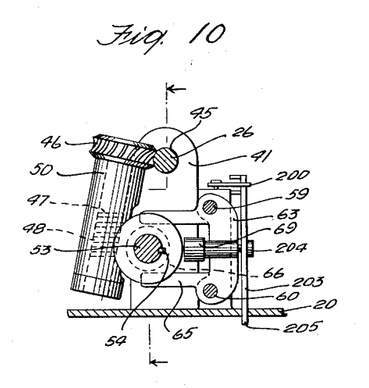
Figure 10 is a detached detail view of parts of the driving apparatus.
Figure 11:
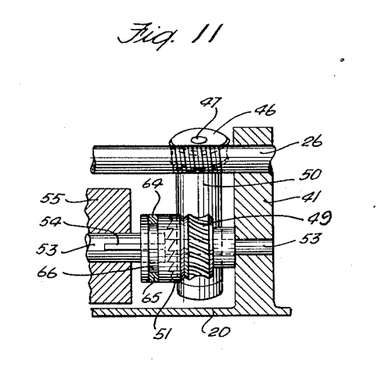
Figure 11 is a vertical sectional view taken along the line 11—11 of Figure 10.

At its portion adjacent the bearing 41, the shaft 26 has formed thereon a thread or worm 45 with which engages a worm wheel 46. Referring to Figures 10 and 11, these parts are shown more in detail. The worm wheel 46 is fixed upon a shaft 47 which extends downwardly and has formed thereon a thread or worm 48 meshing with a worm wheel 49. Preferably the shaft 47 is encased in a casing 50 having therein an opening for the entrance of the worm wheel 49, the casing 50 forming a support and thrust bearing for the shaft. As best shown in Figure 11, the worm wheel 49 is mounted to rotate freely on a shaft 53 which is rotatably supported at its right-hand end in the post 41. On the left-hand face of this worm wheel is a clutch member 51 which may be formed integral with the worm wheel. A clutch member 52 is adapted to mate with the clutch member 51. This clutch member 52 is slidably mounted upon the shaft 53 and splined thereto by a suitable key 54. Thus the shaft 53 is adapted to be slowly rotated through the worm drive from the shaft 26. The drive of the shaft 53 may be thrown in or out by means of the clutch 52—51.

Figure 2:
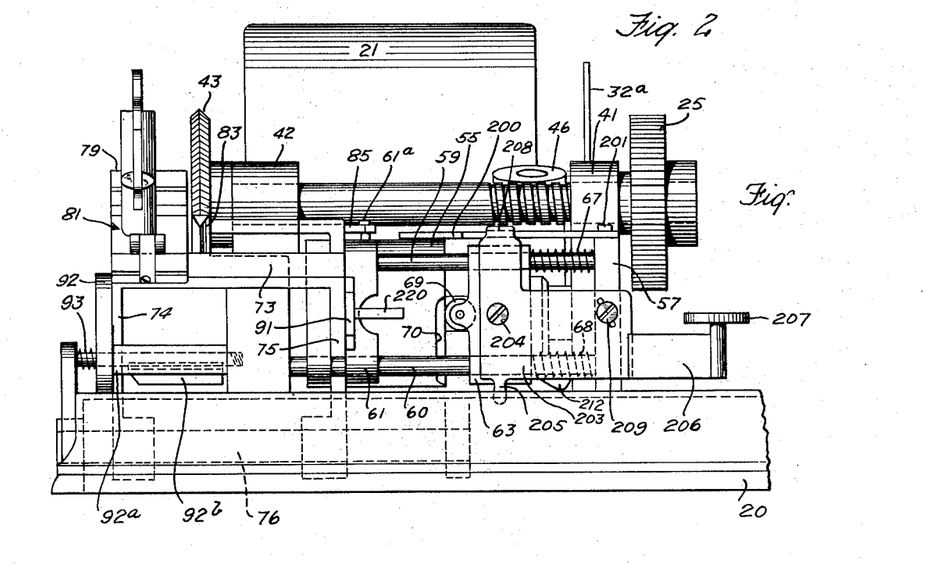
Figure 2 is a front elevation of the machine.

The shaft 53 carries thereon a cylinder 55 having in its cylindrical outer surface a cam groove 56 (Figure 1). As shown in Figures 1 and 2 and also in Figure 5, extending between and supported by a pair of uprights 57 and 58, conveniently positioned to the front of posts 41 and 42, respectively, are a pair of horizontal rods 59 and 60. Slidably mounted upon these rods is a member 61 which carries upon its side facing the cam 55 a roller 62. This roller 62 (see Figure 1) engages with the groove or cam slot 56 in the surface of the cam 55, the cam slot being shaped to move the member 61 back and forth along the supporting rods 59 and 60. In the position shown in the drawings, the member 61 is at its extreme left-hand position. The groove 56 extends all the way around the cam 55 and is shaped to impart a uniform movement to the member 61. Starting from the position shown in the drawings, it will be seen that a complete rotation of the cam 55 will move the member 61 to the right and back again to its initial position.

Also mounted upon the supporting rods 59 and 60 to the right of the member 61 is a second slidable member 63 which is shown in detail in Figure 10. This member 63 is provided with a pair of inwardly projecting arms 64 and 65 which engage with a circumferential groove 66 formed in the slidable clutch member 52 (Figure 11). In the position shown in the drawings, the clutch member 52 is moved to the right to its position of engagement with the clutch member 51 to transmit drive to the cam 55. It will be seen that a movement of the member 63 to the left will, through the arms 64 and 65 disengage the clutch member 52 from member 51, and halt the rotation of cam 55.

As best shown in Figure 2, there are provided about the supporting rods 59 and 60 at the right of the member 63 a pair of compression springs 67 and 68 which continually urge the member 63 to the left and hence urge the clutch member 52 toward the position of disengagement. The member 63 carries a roller 69 which is adapted to engage the right-hand end surface of the cam 55 adjacent the edge thereof. This engagement of the cam 55 with the roller 69 is adapted to hold the member 63 to the right against the action of the springs 67 and 68 and thus hold the clutch member 52 in position of engagement with member 51 at all times except when the cam is in such position of its rotation that it has moved the member 61 to its extreme left position, as shown in the drawings. At this point a recess 70 formed in the end surface of the cam 55 comes opposite the roller 69 and permits the member 63 to move to the left under the action of the springs 67 and 68, disengaging the clutch member 52 from member 51.

Figure 1A:
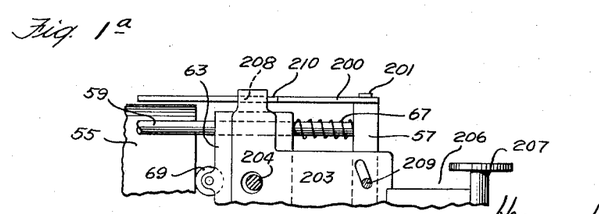
Figure 1a is a front elevation of a latch mechanism for operating a clutch, the latch being shown in operative position.

As is best shown in Figure 1, there is provided above the member 63 a horizontal arm 200 which is pivoted about a vertical screw 201 in the top of the upright 57. This arm is urged to swing outwardly toward the front of the machine by a leaf spring 202. As shown in Figure 1a and also in Figure 2, against the front surface of the member 63 is positioned a member 203 which is fastened thereto by a screw 204. Adjacent its left-hand end this member 203 is provided with a downwardly projecting lug 205 which enters an opening (see Figure 10) in the surface of the base 20, thus forming in effect a pivot about which the member 203 may swing. The right-hand end of the member 203 has an arm 206 which extends outwardly toward the front of the machine and is provided at its outer end with a button 207. By depressing the button 207, the upper portion 208 at the left-hand end of the member 203 is swung to the right, swinging about the lug 205. This movement is imparted to the member 63 and the roller 69 through the connecting screw 204. In order to support the member 203 and to guide it in its swinging movement, there is provided a screw 209 which passes through a slot in the member 203 and enters the upright 57.

As shown in Figure 1, the front edge of the arm 200 has therein a notch 210 which is adapted to receive and hold the upper end portion 208 of the member 203. Also, the left-hand end of the arm 200 is inclined or beveled as shown at 211. In the position of the parts shown in the drawings, the part 208 of the member 203 is in engagement with the notch 210. As will be seen from the drawings, this notch is so positioned that it holds the member 203 and the member 63 therewith in such position that the roller 69 is held to the right and out of engagement with the recess 70 of the cam 55, against the action of the springs 67 and 68. The clutch member 52 is thus held in engagement with member 51, the arm 200 with its notch 210 serving as a latch which holds the clutch members in engagement against the action of the springs tending to disengage the clutch members.

In the operation of this apparatus, the initial positions of the cam 55 and of the sliding member 61 are as shown in the drawings, the member 61 being at its extreme left position. In such position of the parts, the recess 70 in the cam 55 is positioned opposite to the roller 69, but the roller 69 is held to the right by the latch 200 against the action of the springs 67 and 68, whereby the clutch members are held in engagement and the cam 55 is rotated. As the cam 55 rotates, the recess 70 moves out of registry with the roller 69 and the member 61 moves to the right. As the member 61 nears the end of its movement toward the right, the projecting pin 61ª thereon (Figure 1) strikes the beveled end 211 of the latch 200 and swings the latch inwardly about the pivot screw 201. This releases the part 208 of the member 203 from the latch, and the roller 69 may now move to the left under the urge of the springs 67 and 68; however, at this point, the recess 70 of the cam has moved out of registry with the roller 69 and the end surface of the cam holds the member 63 to the right and holds the clutch members engaged, the drive of the cam now continuing without the assistance of the latch 200.

As shown in Figure 1a, the screw 204 which connects the member 203 with the member 63 is threaded into the member 63 and passes through an enlarged opening in the member 203. A leaf spring 212 (Figure 2) bearing against the top of the base 20 continually urges the member 203 to swing to the left (in counter-clockwise direction) about the lug 205. When the latch 200 is thrust back by the pin 61ª, and the roller 69 comes against the end of the cam 55 to hold the clutch in against the action of the springs 67 and 68, as has been described, the spring 212 swings the member 203 to the left relative to the member 63 through a short distance permitted by the enlarged opening through which the screw 203 passes. This movement carries the upper portion 208 of the member 203 to the left beyond the edge of the notch 210, as shown in Figure 1a. Now as the member 61 moves back toward the left under the drive of the cam 55, moving the pin 61ª out of engagement with the beveled end 211 of the latch, the latch 200 cannot swing back to let the part 208 enter into the recess 210. The member 61 continues its movement to the left with the end surface of the cam 55 alone holding the clutch members 51 and 52 in engagement against the action of the springs 67 and 68. When the cam has completed one rotation, moving the member 61 to the right and then back to the left to its initial position, the recess 70 again comes into registry with the roller 69, the member 63 moves to the left and with it one of the clutch members (see Figure 11) and the clutch is disengaged to interrupt the drive of the cam. Thus, the member 61 will move to the right and back again to its initial position and stop.

The mechanism stops with the roller 69 resting in the recess 70, with the clutch member 52 disengaged from member 51 and with the part 208 of the member 203 moved to the left and out of registry with the recess 210 in the latch member 200. In order to again start the drive of the cam 55 and of the member 61, it is necessary simply to depress the button 207. This action swings the member 203 to the right, member 203 moving the member 63 through which clutch member 52 is moved into engagement with the clutch member 51, and then also the latch 200 snaps into position to hold the clutch engaged, the swinging of the member 203 bringing the part 208 thereof in line with the recess 210 of the latch 200. The member 61 then starts its movement to the right and the action described above is repeated, the member 61 moving to the right, then back to its initial position and stopping.

Figure 3:
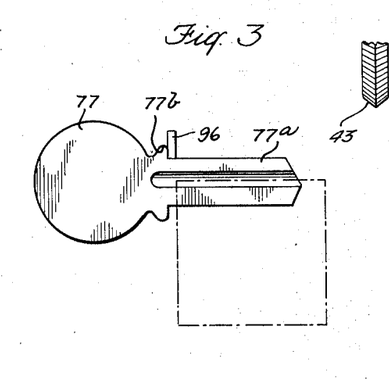
Figure 3 shows diagrammatically a key blank positioned in relation to certain parts of the machine.
Figure 4:
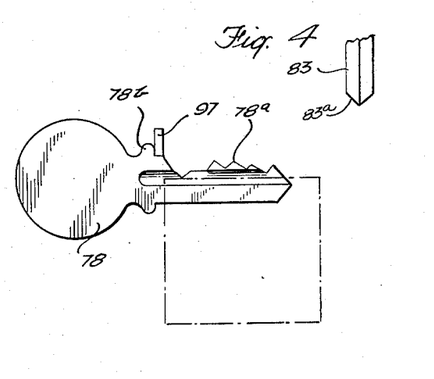
Figure 4 shows certain parts of the apparatus in relation to a master key or guide key which is to be followed in cutting the key blank of Figure 3.

Mounted in front of the cutter 43 is a carriage 73 which is slidably supported by a pair of legs 74 and 75 (see Figure 2) upon a longitudinal shaft or rod 76 which is mounted within the base 20, the legs 74 and 75 projecting downwardly through a slot 162 in the top of the base. This carriage 73 is thus movable longitudinally in a direction substantially parallel to the direction of movement of the member 61, and it is provided with means for supporting a key blank to be operated upon by the cutter 43 and with means for supporting a master key or guide key. Keys to be cut by the cutter 43 are of the type known as Yale keys or cylinder keys and in Figures 3 and 4 are illustrated a key blank 77 and a master key or guide key 78 of this type. The purpose of the cutting operation by the cutter 43 is accurately to reproduce in the key blank 77 the shape of the key 78.

Figure 5:
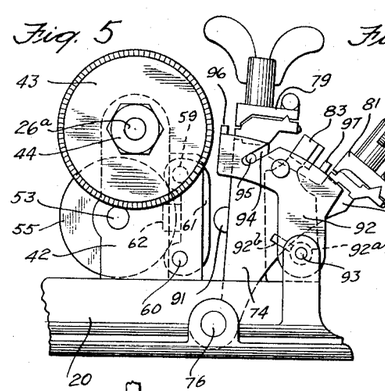
Figure 5 is a partial end elevation showing parts of the machine as viewed from the left of Figure 2.
Figure 6:
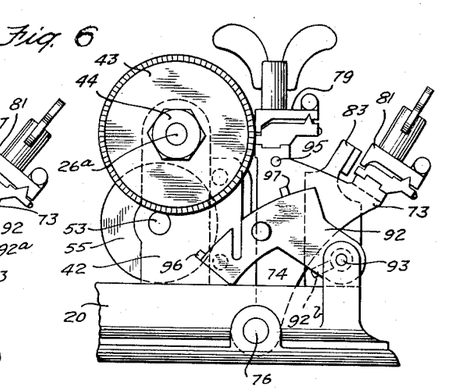
Figure 6 is a view similar to Figure 5 but showing the parts in a different position.

As best shown in Figures 5 and 6, the key blank 77 to be cut is clamped in a clamping device mounted upon the carriage 73 and indicated generally by the numeral 79; the master key or guide key 78 is clamped upon the carriage 73 in a clamping device indicated generally by the numeral 81. The key blank 77 is clamped in the device 79 with its edge 77ª facing toward the cutter 43, and the guide key 78 is clamped in position with the edge 78ª facing a guide 83. The carriage 73 is capable of swinging, about the axis of shaft 76, toward and away from the cutter 43, and a spring 84 (Figure 1), stretched between a projecting pin 85 on the carriage 73 and the upright lug 61ª on the sliding member 61, urges the carriage to swing inwardly toward the cutter 43. This spring thus urges the edge 77ª of the key blank 77 against the cutter 43 and urges the edge 78ª of the guide key 78 against the guide 83.

The guide 83 is seen in Figure 1 and also in Figures 5 and 6. Its mounting is not shown in detail herein since this feature is not of importance as relating to the present invention, but preferably the guide is mounted as shown in my co-pending application Serial No. 88,729, filed February 17, 1926, now Patent No. 1,866,033, and is adjustable in position and interchangeable with other guides as described therein.

The carriage 73 carrying the key blank 77 and the guide key 78 is adapted to be moved back and forth upon the supporting shaft 76 by connection with the member 61 which is driven from the cam 55 as before described. The driving connection between the carriage 73 and the member 61 preferably comprises an arm 91 (shown in Figures 1, 2 and 12), which is mounted upon the right-hand end of the carriage 73 and engages a recess 61ᵇ (see Figure 12) in the surface of the member 61. By swinging the carriage 73 about its supporting shaft 76 and in a direction away from the cutter 43 against the action of the spring 84, the arm 91 is moved out of the recess 61ᵇ and hence out of engagement with the member 61 and the driving connection between the member 61 and the carriage 73 is thus broken.

Figure 12:
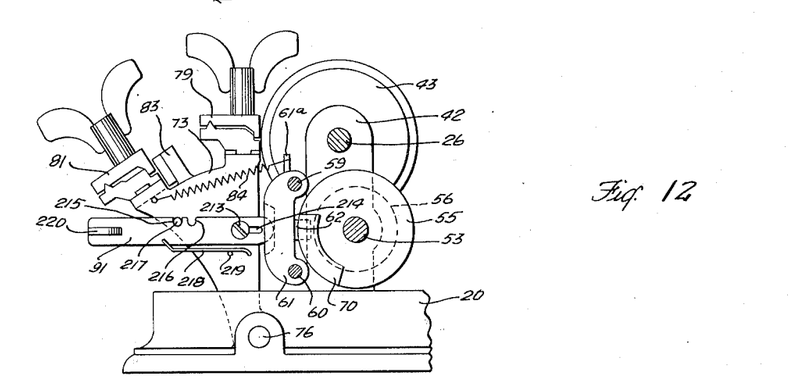
Figure 12 is a vertical sectional view taken along the line 12—12 of Figure 1.

Referring to Figure 12, the arm 91 is shown in detail. It is slidably mounted upon the side of the carriage 73 by a screw 213 passing through a slot 214 in the arm. In the upper edge of the arm are two notches 215 and 216, and projecting from the side of the carriage is a pin 217 which is adapted to coact with these notches. A suitable spring 218 fastened to a pin 219 on the carriage bears upwardly against the arm 91 and urges the arm against the pin 217. At its outer end the arm is preferably provided with a projecting flange 220 which may be engaged by the thumb to swing the arm downwardly about the screw 213 against the action of the spring 218.

In the position shown in the drawings, the notch 215 is in engagement with the pin 217. In this position the rear end of the arm 91 is in driving engagement with the sliding member 61 so that the carriage 73 partakes of the movement of the member 61. By depressing the flange 220 and sliding the arm 91 to the left, as viewed in Figure 12, the notch 216 is moved into engagement with the pin 217. This moves the arm 91 so that the end thereof does not engage the member 61. By now disconnecting the spring 84 from the pin 61ª, the carriage may be moved manually back and forth along its supporting rod 76. Thus, when it is desired to cut keys without the aid of the automatic feed feature, the drive of the carriage is readily disconnected and the carriage may thereupon be manipulated manually.

As shown in Figures 1 and 2, there is provided at the left-hand end of the apparatus an arm 92 which is pivoted at its lower portion upon a supporting shaft or rod 93, rigidly supported upon the base 20. This arm 92 and the parts with which it coacts are shown in detail in Figures 5 and 6, the arm being shown in operative position in Figure 5 and in inoperative position in Figure 6. This arm is provided in its upper edge with a sloping slot 94 which is adapted to engage a pin or projecting lug 95 on the side of the carriage 73. When the arm is inoperative, as shown in Figure 6, it is swung downwardly and rests at its outer end upon the surface of the base 20. When moved upwardly to the position shown in Figure 5 the slot 94 engages with the pin 95, and the carriage 73 when swung outwardly about its supporting shaft 76 and away from the cutter 43 is thereby locked in the outward position shown in Figure 5, against the action of the spring 84.

In addition to thus moving the carriage 73 away from the cutter and holding the carriage in this position, the arm 92 is provided with a pair of projecting lugs 96 and 97 which serve as guides to aid in properly positioning the key blank 77 and the guide key 78 in their respective clamping devices 79 and 81, so that they will be properly relationed lengthwise of the carriage with respect to the cutter 43 and the guide 83 respectively. In Figures 3 and 4 the lugs 96 and 97 are shown in operative relation to the key blank 77 and the guide key 78 with which they respectively coact. It will be seen that these two lugs provide shoulder stops or abutments against which the shoulders 77ᵇ and 78ᵇ of the key blank and guide key may be moved.

Figures 7, 8, 9:
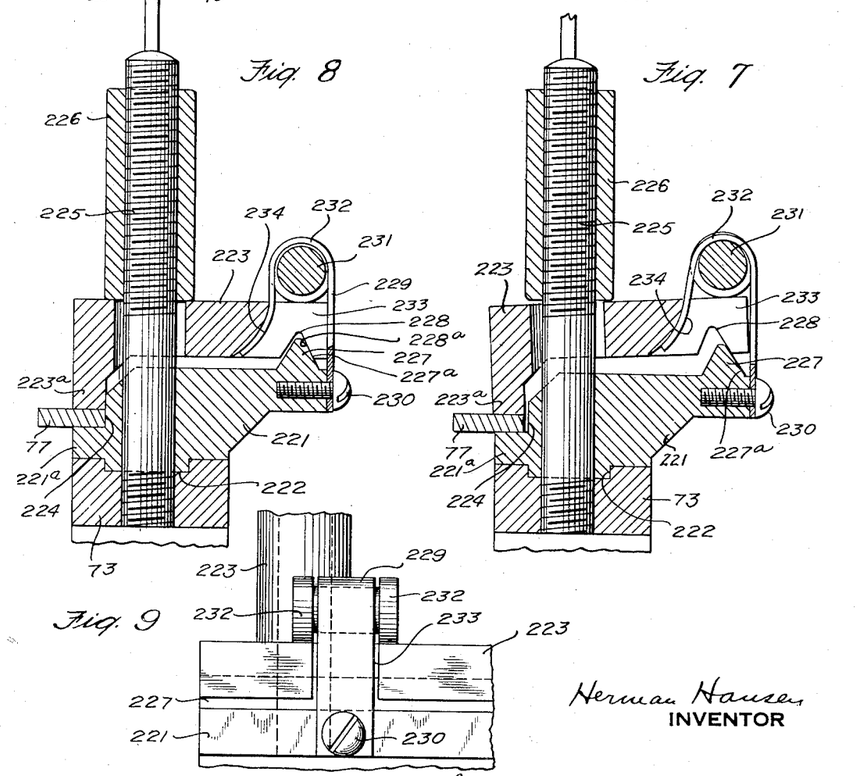
Figure 7 is a vertical sectional view in enlarged detail of a key holding device which is shown in Figures 5 and 6.
Figure 8 is a view similar to Figure 7 but showing the parts of the device in a different position.
Figure 9 is a front elevation of parts viewed from the right-hand side of Figure 8.

The clamping devices 79 and 81 are preferably substantially identical so that one only need be described in detail. In Figures 7, 8 and 9 there are shown enlarged detail views of one of these clamps. The clamp comprises a lower member 221 which is supported upon the carriage 73 and preferably interfitted therewith, as shown at 222, and an upper member 223. Between the two jaw portions 221ᵃ and 223ᵃ of these two members the key, such as 77, is adapted to be clamped. The part 221 has a shoulder 224 extending along the key clamping surface thereof, and this shoulder of the clamping device adapted to aline and hold the key blank is exactly parallel to the corresponding shoulder of the clamping device adapted to hold the guide key or master key. Thus, when the keys are positioned in the clamping devices with their rear edges firmly up against these shoulders 224, the key blank and the master key are in proper parallel relation and the cutting of the key blank will be done accurately.

Threaded into the carriage 73 is a post 225 which extends upwardly through the part 221 and through an enlarged opening in the part 223 and which is provided at its upper end with a thumb nut 226. By threading the thumb nut downwardly along the post 225, the member 223 is forced downwardly toward the member 221 to clamp the key.

On the upper surface of the upper part 221 is formed a longitudinal ridge 227 which is preferably wedge-shaped as shown. In the lower surface of the member 223 is formed a longitudinally extending groove 228 which is parallel to the ridge 227 and which is adapted to mate substantially therewith. At the side opposite the clamping portions 221ᵃ and 223ᵃ the members 221 and 223 are connected, preferably by a leaf spring 229. This spring is secured to the lower member 221 as by a screw 230 and passes upwardly over a pin 231 extending between a pair of spaced flanges 232 resting on the upper surface of the part 223. After passing over the part 231, the end portion of the spring 229 curves downwardly to the left, as viewed in Figures 7 and 8, entering a slot 233 in the part 223 and bearing against a curved surface 234 thereof. This spring, in addition to detachably connecting the parts 221 and 223, thus urges the part 223 to the left, and when the thumb nut 226 is loosened, the member 223 assumes a position such as that shown in Figure 7 relative to the member 221. When the thumb nut is loosened, the spring urges the member 223 toward the cutting tool or toward the guide, as the case may be, this movement between the member 223 and the member 221, being permitted by the enlarged opening in the member 223 through which the post 225 passes.

When the key such as 77 is inserted, the parts are in a position such as that shown in Figure 7, it being noted that the spring 229 has moved the jaw member 223ᵃ beyond (to the left as seen in Figure 7) the coacting jaw member 221ᵃ and that the lower portions of the inclined surface 228ᵃ has ridden up along the inclined surface 227ᵃ of the ridge 227. Now when the thumb nut 226 is threaded downwardly to clamp the key, the surface 227ᵃ of the ridge 227 coacting with the surface 228ᵃ of the groove 228 causes a two-fold movement of the member 223 relative to the member 221; these coacting surfaces effect a drawing of the member 223 to the right (as viewed in Figures 7 and 8) and a movement of the clamping part or jaw member 223ᵃ toward the shoulder 224. As this action takes place, the part 223ᵃ has achieved a grip upon the surface of the key 77 and the result is that the key is moved inwardly (to the right) as the clamping device is tightened up and is by this inward movement drawn firmly against the shoulder 224 when the nut 226 has been threaded down to its final clamping position, as shown in Figure 8.

The construction just described is of distinct advantage in making certain that the key will be always clamped in the exactly correct position and in always ensuring the proper relation between the positioning of the key blank and the positioning of the guide key. The keys are clamped in position accurately and dependably with the greatest ease and the convenience afforded results in a very substantial saving in time, the above-described action avoiding the necessity of exercising care and skill in putting the key blank and master key in their respective clamping devices and also avoiding the necessity of correcting inaccuracies in positioning of the key or key blank.

When the arm 92 is moved upwardly (Figure 5) to operative position, thereby moving the carriage 73 away from the cutter 43, it will be seen that the arm 91 moves out of recess 61ᵇ and its driving connection with the member 61 is interrupted. Therefore the drive of the carriage 73 cannot be started until the arm 92 is moved downwardly into inoperative position. The apparatus is thus safeguarded, and damage to the lugs 96 and 97 or disrupting of the clamped keys which might occur by the operative carelessly starting the drive of the carriage without moving the arm 92 out of operative position, is effectively avoided.

Referring now to Figures 5 and 6, and also to Figure 2, the arm 92 which locks the carriage 73 in its inoperative position, has formed thereon a tubular part 92ᵃ through which the supporting rod 93 passes. Projecting from this part 92ᵃ is a projecting flange or web 92ᵇ which is cut away at its left-hand end adjacent the arm 92, as shown at 92ᶜ in Figure 2. This projecting web 92ᵇ prevents the arm 92 from being raised from the position shown in Figure 6 to its operative position shown in Figure 5, except when the carriage 73 is at the end of its stroke to the left and in the position shown in Figure 2, when the leg 74 can clear and by-pass the end 92ᶜ of member 92ᵇ. When the carriage moves to the right the leg 74 thereof comes opposite the flange 92ᵇ and, if it is now attempted to raise the arm 92, the web 92ᵇ swinging therewith strikes the leg 74 and prevents the arm from being lifted. Thus, the gaging means which this arm 92 provides cannot be utilized except when the carriage 73 is at its extreme left-hand position. This insures that when a key is adjusted into the clamping device with the aid of the gaging arm 92, the carriage is in proper position to properly coact with the gaging arm.

In the operation of cutting a key blank of the cylinder type such as the key blank 77 shown in Figure 3, the parts are initially positioned as shown in Figures 1 and 2 of the drawings. The cutter 43 is rapidly rotated by its driving connection with the motor 21. The cam 55 is so positioned that the member 61 and hence the carriage 73 in driving connection therewith are at their extreme left positions. The recess 70 in the cam 55 is in registry with the roller 69 on the member 63 and the clutch member 52 is thus held in position of disengagement from member 51. The operator draws the carriage 73 (see Figure 5) outwardly and moves the arm 92 upwardly (leg 74, as will be clear from Figure 2, clearing the end portion 92ᶜ of the flange member 92ᵇ), arm 92 coacting with pin 95, thereby locking the carriage in this outwardly drawn position against the action of the spring 84. This outward movement of carriage 73 also disengages arm 91 from member 61 (see Figure 5). The operator then clamps the guide key 78 in the clamping device 81 with the shoulder 78ᵇ thereof properly up against the lug 97, and clamps the key blank 77 in the clamping device 79 with the shoulder 77ᵇ properly up against the lug 96. In each instance, the inward movement of the upper clamping jaw 222ᵃ (see Figures 7 and 8) causes an inward drawing of the key or key blank to solidly aline the back edge of the latter against the shoulder 224. The arm 92 is then moved downwardly to inoperative position, permitting the carriage 73 to move inwardly, the arm 91 thereon entering into driving engagement with the member 61.

The operator then depresses the button 207 thereby swinging the member 203 in clockwise direction about the pivot 205 (see Figure 2) and this movement of the member 203 moves the member 63 in a direction to the right, as viewed in Figures 1 and 2, thereby moving clutch member 52 (see Figure 11) into engagement with clutch member 51 and thus setting the cam 55 in rotation; the above-mentioned movement of the member 203 also causes the part 208 thereof to be brought into registry with the notch 210 of the spring latch 200, the latter springing into locking position, as shown in Figure 1.

The interengagement of the two clutch members sets the cam 55 in rotation and thus starts the movement of the carriage 73 to the right, as viewed in Figures 1 and 2. The initial movement of rotation of the cam 55 moves the recess 70 of the cam 55 out of juxtaposed relation to the roller 69. As soon as the carriage reaches the end of its movement in right-hand direction pin 61ᵃ engages with the beveled portion 211 of the latch 200 and continued movement of the carriage and hence of the pin 61ᵃ to the right swings the latch 200 in clockwise direction, as viewed in Figure 1, and thus disengages the latch 200 from the part 208 of the member 203, the parts assuming the position shown in Figure 1a from which it will be noted that the cam roller 69 moves slightly to the left and into engagement with the end face of the cam 55 thereby continuing to hold the clutch members in interengagement. The carriage 73 then moves to the left and upon substantially completing its traverse in left-hand direction the rotation of the cam 55 brings the recess 70 again into juxtaposed relation to the roller 69, permitting the latter to move to the left, as viewed in Figure 2, under the urge of the springs 67 and 68, and thus disengaging clutch member 52 from member 51; the rotation of the cam 55 and the movement of the carriage 73 are thus halted, it being noted that the parts are left in such a position that a subsequent actuation of the button 207 (see Figure 1a) recommences the above-described cycle.

During this movement of the carriage the surface 78ᵃ of the guide key 78 moves along the edge 83ᵃ of the guide 83 the carriage being urged inwardly by the spring 84. As the carriage moves along, it swings inwardly and outwardly about its supporting shaft 76 in accordance with the depth of the depressions in the surface or edge of the guide key 78. The key blank 77 partakes of this in and out movement as it moves across the cutter 43. The shape of the surface 78ᵃ of the guide key is thus accurately reproduced in the edge 77ᵃ of the key blank. During the operation, the key blank receives two cuts, moving relative to the cutter to the right and then back again to its initial position. As the key blank moves to the right it is given what might be termed a roughing cut by cutter 43 and as it moves back to the left it is given what might be termed a finishing cut. The shape of the guide key 78 is thus faithfully dependably reproduced in the key blank 77 as well as expeditiously and with the greatest accuracy.

It may here be pointed out that the traversing movement of the carriage 73 as above described may be interrupted at will and at any point in the path of travel of the carriage; this may be accomplished by manually swinging the carriage 73 in a direction away from the apparatus, thereby moving the member 91 out of the recess 61ᵇ in the member 61. From the foregoing, it will be seen that there is herein provided a machine which achieves the objects of this invention and accomplishes many advantages of practical importance.

As many possible embodiments may be made of the above invention, and as many changes might be made in the embodiment above set forth, it is to be understood that all matter hereinbefore set forth shown in the accompanying drawings, is to be interpreted as illustrative and not in a limiting sense.

I claim as my invention:

1. In apparatus of the class described, in combination, a key cutting tool, and means adapted to support a key for operation thereon by said tool comprising a pair of opposed gripping members adapted to receive said key therebetween, one of said members being movable toward and away from the other, a substantially wedge-shaped projection on one of said members, a recess in the other of said members adapted substantially to mate with said projection when said members are brought together, and spring means tending to hold said two members in such relative positions that said projection and said groove are out of registry and one of said members is displaced in the direction of the base of said wedge-shaped projection.

2. In apparatus of the class described, in combination, a key cutting tool, and means adapted to support a key for operation thereon by said tool comprising a pair of relatively movable members having oppositely disposed surfaces adapted to grip said key, one of said members having adjacent its gripping surface a surface against which the edge of said key is adapted to be seated to properly position said key with respect to said tool, means for forcing the other of said members toward the member having said last-mentioned surface, cam means responsive to actuation of said forcing means for causing said other member to move in a direction toward said last surface of said one member and thereby to draw said key against said last surface as said gripping surfaces are moved together to grip said key.

3. In apparatus of the class described, in combination, a key cutting tool, and means adapted to support a key for operation thereon by said tool comprising a pair of members having oppositely disposed gripping surfaces adapted to grip said key therebetween, one of said members being movable toward and away from the other, the other of said members having adjacent its gripping surface a shoulder against which the edge of said key is adapted to be seated to properly position said key with respect to said tool, means adapted when said movable member is moved toward said other member and toward engagement with said key to move the gripping surface thereof in a direction toward said shoulder, and spring means acting upon said movable member when the latter is not gripping a key to move and hold said movable member in two directions, one of which is away from the gripping surface of said other member and the other of which is substantially at right angles thereto and away from said shoulder, thereby to prepare said members for the subsequent reception of another key.

4. In apparatus of the class described, in combination, a key cutting tool, and means adapted to support a key for operation thereon by said tool comprising a pair of members having oppositely disposed gripping surfaces adapted to grip said key therebetween, one of said members being movable toward and away from the other, the other of said members having adjacent its gripping surface a third surface for properly positioning said key in said supporting means, means for effecting movement of said movable member in a general direction toward the other member, and means adapted when said movable member is moved toward the other to grip said key to guide the gripping surface of said movable member in a direction of movement such that it tends to draw said key toward said third surface, said last means including a pair of coacting inclined surfaces on said two members, said inclined surfaces sliding relative one to the other as said second-mentioned means is operated and causing movement of said movable member also in a direction toward said third surface.

5. In apparatus of the class described, in combination, a rotating key cutting tool, a carriage movable in a path substantially parallel to the axis of rotation of said tool, and means upon said carriage adapted to support a cylinder key for operation thereon by said tool, said means comprising a clamping device adapted to grip said key and having a shoulder extending substantially parallel to said path of movement of said carriage, said clamping device comprising two relatively movable gripping parts and means mounting said gripping parts so that relative movement therebetween in two directions may take place, one of which is in a direction to cause said gripping parts to grip said key and the other of which is a direction transverse to the length of the key and toward said shoulder, proper operation of said tool on said key requiring that the back edge of said key extend parallel to said path of movement, and means effective upon operation to bring about said relative movement between said gripping devices in said two directions thereby to draw said key into said clamping device and urge the back edge thereof against said shoulder when said clamping device is operated to grip said key, whereby said key is alined with its back edge parallel to said path of movement.

6. In apparatus of the class described, in combination, a key cutting tool, and means adapted to support a key for operation thereon by said tool comprising a member having a gripping surface adjacent said tool and a shoulder facing toward said tool and against which an edge of said key is adapted to be seated to properly position said key, a member movable toward and away from said first member and having a gripping surface adapted to coact with said gripping surface of said first member to grip said key therebetween, and spring means connecting said two members and urging said movable member in a direction away from said shoulder and toward said tool, said two members having coacting surfaces adapted when said movable member is moved toward said first member to guide said movable member in a direction away from said tool.

7. In apparatus of the class described, in combination, a support carrying a key cutting tool, a supporting carrying means adapted to hold a key or key blank for operation thereon by said tool, means for effecting relative movement between said supports along a straight-line path, said key holding means comprising a pair of members having oppositely disposed gripping means adapted to grip said key therebetween, means mounting one of said means so that it is movable toward and away from the other in a gripping direction and so that it is movable in a direction transverse to said gripping direction, and the other of said members having means against which said key blank is intended to be abutted for alining the latter with said straight-line path of movement, and means for forcing said members toward one another and at the same time moving said movable member transversely of its direction of gripping movement to draw the key toward said alining means, whereby said key blank is abutted against said alining means.

8. In apparatus of the class described, in combination, a key cutting tool, a support therefor, a second support, means mounting said two supports so that one may be moved relative to the other along a predetermined path, two clamping devices upon said second support, one for holding a key blank for operation thereon by said cutter and the other for holding a pattern, each of said clamping devices comprising two gripping members and having means against which the parts clamped thereby are abutted to aline them relative to said path of movement, means mounting one of said gripping members of each clamping device for movement relative to the other clamping member in a direction toward the other clamping member and also in a direction transversely of said first-mentioned direction and toward said alining means, and means effective upon operation to give the movable clamping member of said clamping devices a movement in said two directions for thereby clamping the parts to be clamped and respectively drawing them against the respective alining means of said devices.

9. In apparatus of the class described, in combination, a key cutting tool, a support therefor, a second support, means mounting said two supports so that one may be moved relative to the other along a predetermined path, two clamping devices upon said second support, one for holding a key blank for operation thereon by said cutter and the other for holding a pattern, each of said devices comprising a relatively fixed jaw member having a shoulder against which the parts to be clamped are intended to be abutted and thereby alined relative to said path of movement, and a movable jaw coacting therewith, and means operative to draw said movable jaw toward said shoulder while also drawing the movable jaw toward the fixed jaw, thereby to draw the part to be clamped against said shoulder as well as to clamp it in place.

10. In apparatus of the class described, in combination, a key cutting tool and means for supporting a key blank to be operated upon thereby, said means including two clamping members and key blank alining means, means mounting said clamping members for relative movement in a direction to clamp the key blank and for permitting movement of one of said clamping members in a direction toward said alining means, spring means acting normally to hold said clamping members apart and for holding said one of said clamping members away from said alining means, and means operative when one of said clamping members is forced toward the other to cause one of said clamping members to draw the key inwardly against said alining means.

11. In apparatus of the class described, in combination, a key cutting tool and a support therefor, a second support, a key blank holding device on said second support, a key holding device on said second support, means mounting said supports to permit relative movement therebetween in a direction lengthwise of the key blank and also in a direction transversely of the key blank, a guide member for controlling said second movement, said key holding device including means against which the key is to be abutted to aline it with respect to said first movement and means for simultaneously causing said key to be clamped and drawn inwardly against said alining means.

12. In apparatus of the class described, in combination, a cutting tool and means for supporting a key blank to be operated upon thereby, said means including two clamping members and key blank alining means, manual means adapted upon operation to force one of said clamping members toward the other, and means forming a controlling connection between said two clamping members and comprising a V-shaped groove in one of said members and a V-shaped projection in the other of said members and adapted to be received in said V-shaped groove, and spring means adapted when said manual means is substantially ineffective for causing one of said members to be displaced relative to the other in a direction away from said alining means and to hold said V-shaped projection and said V-shaped groove out of mating relation.

HERMAN HANSEN.